Figure 1:
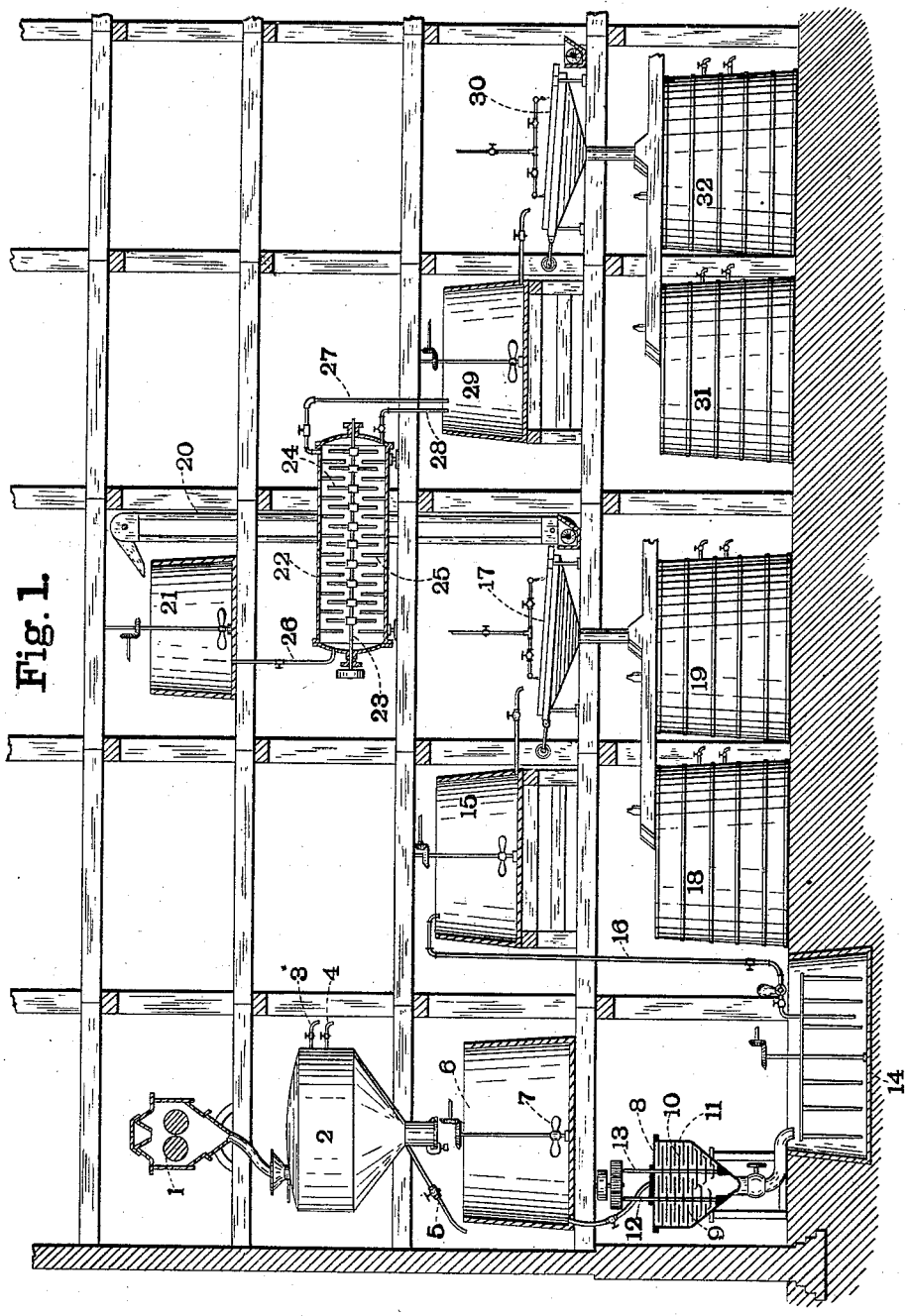

(No Model.)
2 Sheets—Sheet 1.

W. F. BIRGE.
MANUFACTURE OF STARCH.

No. 345,409. Patented July 13, 1886.

Witnesses.
Jennie M. Caldwell.
Mrs. J. S. Johnson

Inventor.
Walter F. Birge
By James Sangster
atty.

(No Model.) 2 Sheets—Sheet 2.

W. F. BIRGE.
MANUFACTURE OF STARCH.

No. 345,409. Patented July 13, 1886.

Witnesses.
Jennie H. Caldwell.
Mrs. J. G. Johnson

Inventor.
Walter F. Birge.
By James Sangster
Atty

UNITED STATES PATENT OFFICE.

WALTER F. BIRGE, OF BUFFALO, NEW YORK.

MANUFACTURE OF STARCH.

SPECIFICATION forming part of Letters Patent No. 345,409, dated July 13, 1886.

Application filed March 6, 1886. Serial No. 194,193. (No model.)

*To all whom it may concern:*

Be it known that I, WALTER F. BIRGE, a citizen of the United States, residing in Buffalo, in the county of Erie and State of New York, have invented certain new and useful Improvements in the Manufacture of Starch, of which the following is a specification.

This invention relates to certain improvements on the method of extracting starch from grain for which I have obtained Letters Patent of the United States No. 329,701, dated November 3, 1885, and also upon the mode described in an application I now have pending before the United States Patent Office, serial number of application 192,640, by which improvements I obtain a still larger yield of starch, a large proportion of the starch usually carried off with the bran or offal and lost being recovered and utilized, thereby further materially increasing the yield of starch and proportionately decreasing the cost of extraction.

The art of manufacturing starch as heretofore practiced may be broadly described and classified under two well-known processes—the so-called "sour" or "fermentation" process and the so-called "sweet" or "chemical" process. In the former the grain is steeped in water for several days—such as a week or more—until partial liberation of the starch particles has been effected through the chemical decomposition of the surrounding parts, is then reduced by millstones or like suitable devices, the ground material being then screened in a well-known manner, whereby the starch is separated from the bran or offal, and the resulting starch product being then further refined by separation of the starch from the remaining gluten, which is effected by subsidence in tanks or upon starch-tables, or both. Some of the objections to this process are the small yield of starch obtainable, due to the impossibility of recovering all the starch from the mashed grain, the destruction of starch caused by the action thereon of the acids generated in the long steeping process, the impairment of the quality of the starch and bran from the like cause, and the great length of time which the process requires. In the sweet or chemical process the grain is usually steeped in water for a length of time of from thirty-six to forty-eight hours, is then reduced by millstones or like suitable devices, the ground material being then screened for the separation of the starch from the bran, and the resulting starch product being then treated with either a solution of caustic alkali or dilute acid to effect the chemical decomposition of the remaining gluten, after which separation of the starch from the gluten is effected by subsidence in tanks or upon starch-tables, or both. Some of the objections to this process are the loss of yield, resulting in part from the practical difficulty of securing an equable steeping effect at all times, whereby some of the grain may be over steeped and the starch-cells destroyed, while other portions may be under steeped and the starch not liberated, and in part to the practical impossibility of recovering all the starch from the mashed grain, the large expense of chemicals used, and the impairment of the quality of the offal, which is utilized as feed for cattle, through the excessives application of chemicals in the process. Serious defects common to both these processes are the softening by the steeping operations of the gluten and horny substance of the corn to a degree which renders the product as it leaves the mills a nearly homogeneous mass composed of starch, gluten, oil, and fiber, thus necessitating the lengthy and expensive after chemical treatment for their complete separation, or, in default thereof, impairing the quality and reducing the quantity of final starch product. In my process I overcome these objections by making my principal steeping after the grain has been ground, thereby greatly reducing the time required, reaching the starch with the steeping effect directly, without waiting for the softening of its horny surrounding material, and making it possible through the saving of time to steep in comparatively small quantities the grain for a plant of large capacity, and also providing for such control of temperature as to insure uniformity of steeping effect; by insuring a larger yield through the combination of devices for liberating and recovering the starch; by reducing materially the quantity of chemicals required through the system of treatment which leaves the greater portion of germs and gluten in a comparatively hard condition, whereby they are readily washed over the screens and separated from the starch; by avoiding largely the generation of deleterious acids, which occurs when the grain is steeped for so long time as now practiced; by improving the qualities of both starch and offal through the material shortening of the steeping and the whole process and the reduction of chemicals; by the decrease of time and labor required to manufacture a given quantity of product; by the lessened proportionate expense of operation, and by other incidental advantages.

I shall not broadly claim the operations of reducing, steeping, disintegrating, liberating, and separating by themselves, as part are in well-known use, part having been allowed me in Patent No. 329,701, herein referred to, and part are included in my application Serial No. 192,640, also herein referred to; but I will claim the combination of the herein described stages of a process, substantially as set forth, and also the process of a secondary treatment of the bran and liberation and separation of starch therefrom, substantially as described.

As a large portion of the processes described in said patent and in application above mentioned are used and form a part of this mode of extracting starch from grain, I will describe so much of said processes as may be necessary to a full understanding of this method or process. Corn varies greatly in its degrees of hardness according to its age, very old corn, for instance, being hard and flinty, whereas new corn is comparatively soft and moist. To meet this variable condition of the raw material, it is provided in the herein-described process that the grain may be taken dry or after having been subjected to a preliminary steeping in water to soften it; but as the steeping of the grain is a well-known process of long practice, consisting merely of soaking it in warm water in suitable vats or tubs for a length of time dependent upon the condition of the grain, it is not necessary to describe the same in these drawings or specifications, which will show fully and clearly the process as beginning with the reduction of the grain, whether dry or soaked.

Figure 2:
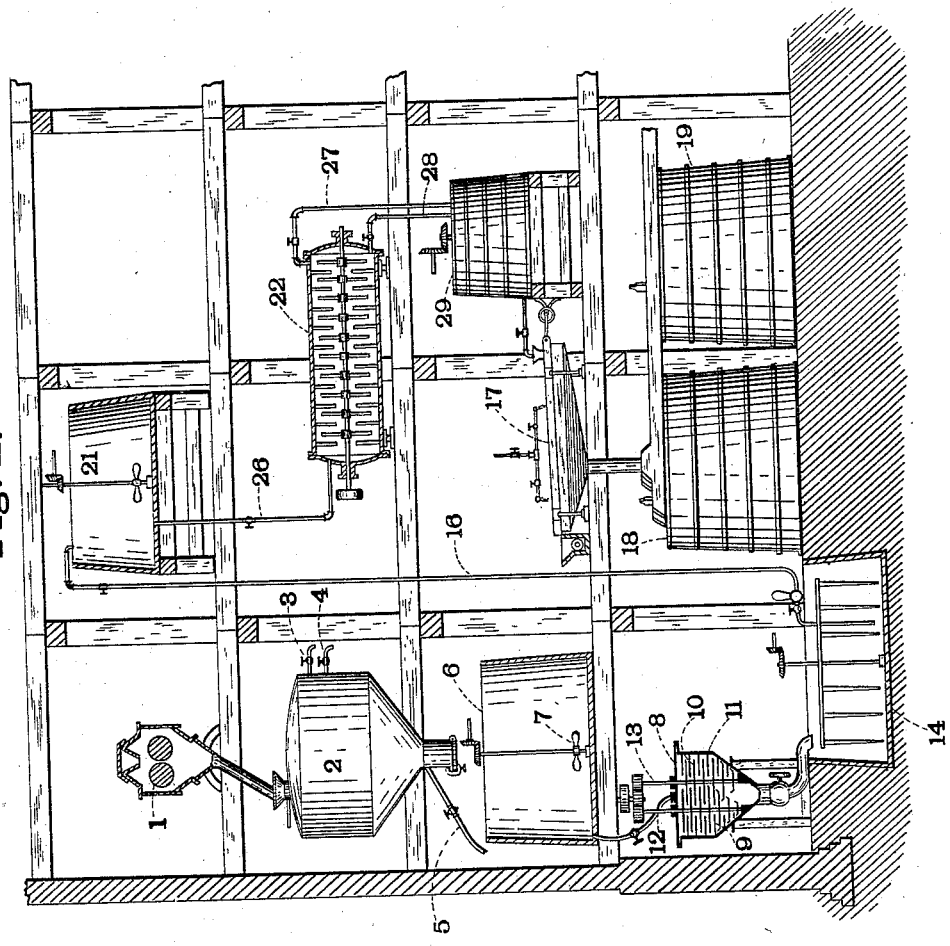

In the accompanying drawings, Figure 1 represents a suitable plant of machinery for carrying out my invention; and Fig. 2 represents a modification or variation of the process, whereby it may be condensed in its operation.

1 represents a reducing-machine by which the grain is coarsely crushed or broken. An ordinary and well-known roller-mill such as shown, having its rollers provided with suitable flutes or ribs, is preferably employed for this purpose; but ordinary millstones, or any other machine adapted for the purpose, may be used, if desired.

2 represents the steep-vat for receiving the broken or coarsely-ground grain from the reducing-machine 1, and in which it is steeped in warm water kept below a temperature of 160° Fahrenheit to prevent the destruction of the starch-cells. It is steeped in this water for a sufficient length of time to expand and soften the starchy portions, and as the kernels of grain have been broken, the warm water has a more free access to the interior or starchy portion, and consequently the process of steeping is more rapid and uniform than when the kernels of grain are steeped without being broken. If it is desired to hasten the process of steeping, the steep-vat may be made to close air-tight and air-pressure applied to the contents in any well-known manner. The steep-vat is provided with a series of waste-pipes, 3 and 4, for instance, at graduated distances from its top, which permit of the surface water being drawn off after the grain has settled, and it is also provided with a fresh-water-supply pipe, 5, near its lowest point, through which fresh water may be pumped or otherwise forced into the steeping grain as often as it may be deemed necessary to renew the water, for the purpose of maintaining the temperature, and also to facilitate the discharge of the grain when the steeping process is completed. The supply-pipe 5 is provided with a suitable check-valve of any well-known construction, to prevent the grain from entering it, and the vat itself may be surrounded with any suitable non-conducting material, if desired, as an aid to maintaining an even temperature.

6 represents the mixing or regulating tank for receiving the steeped grain, and in which it is mixed with additional water, if required, to facilitate its flow into the disintegrator. If the grain is not sufficiently fine, it may be reground to the required degree of fineness before it passes into the mixing-tank 6. A suitable quantity of caustic alkali is preferably added to the mixture in the tank 6 and thoroughly incorporated with the mixture by the stirring-wheel 7 or any other well-known stirring and mixing device. 8 represents a disintegrator especially adapted for this purpose, which receives the mixture from the tank 6, and within which the grain, while held in suspension, is subjected to the action of the disintegrating-arms 9 and beaters 10. The disintegrator consists, preferably, of an upright shell or casing, 11, of boiler or cast iron, with vertical sides conforming in outline to the radii of the revolving arms or beaters on the vertical shafts 12 and 13, and is cone-shaped at its lower part, terminating at the discharge pipe. It is also provided with the usual feed-pipe and inlet and outlet valves. To the interior sides of the shell stationary arms are affixed in series, extending from near the top to near the bottom and converging toward the revolving shafts, a vertical central section being shown in the drawings, so as to give a clearer idea of its construction; but as this disintegrator has been fully and clearly described, shown, and claimed in another application, Serial No. 192,176, now pending in the Patent Office, a further description of its construction here is deemed unnecessary. The broken and steeped grain in a semi-liquid condition, entering the disintegrator from above, is struck by the rapidly-revolving arms with considerable force, the portions of grain being struck at right angles to their direction of motion, and then caught by the stationary arms and thereby subjected to violent percussion at all points and from various directions during its passage through the machine and while in suspension, until it finally escapes at the discharge-pipe. As the previous steeping of the broken grain has loosened and expanded the starchy portions more rapidly than it has acted upon the harder parts, the starchy portion is detached from the harder parts by the mechanical action of the disintegrating devices, and the semi-liquid is discharged from the disintegrator in a condition to permit of ready separation of the starch from the bran and gluten. As the discharge-pipe is larger than the supply-pipe, the material passes through the machine in a state of suspension, impeded only by the revolving and stationary arms, and the rapidity of its passage through the machine and the degree and duration of force exerted upon it are regulated in part by gravity and in part by the speed of the revolving arms and the size of the inlet and outlet openings.

In the drawings I have shown a disintegrator well adapted for my process of liberating the starch; but any other kind of disintegrating-machine adapted for the purpose may be used.

14 represents another mixing-tank or regulating-tank, which in this arrangement of the plant is shown as sunken below the ground floor, and in which the semi-liquid grain is received and reduced with water to a gravity of 8° to 12° Baumé. The mixing-tank is provided with suitable stirring devices, such as a revolving rake or propeller-wheel.

15 is an elevated receiving and supply tank, into which the mixture is pumped from the mixing-tank 14 through the pipe 16, and which is also provided with suitable stirring devices for keeping the mixture in a state of active agitation, to prevent the heavier portions from settling and to preserve a uniform degree of specific gravity.

17 represents an ordinary starch-separator by which the bran and gluten are separated from the starch milk or liquid, and which receives the mixture from the receiving and supply tank 15. As shown in the drawings, the separator consists of a shaking screen upon which sprays of water are delivered, whereby the starch is washed through the meshes of the screen. The screen is covered with wire-cloth which is capable of resisting the action of the alkali; but, if it is preferred to add the alkali to the starch after the sifting operation has been completed, the screen can be covered with bolting-silk. A centrifugal separator or any other suitable separating device may be substituted for the shaking screen, if desired.

18 and 19 represent the settling-tubs which receive the starch-milk from the separator, and in which the starch is allowed to settle. The liquid is then drawn off from above the starch and the latter is further manipulated or refined, as may be necessary, to obtain the desired product, whether commercial starch, glucose, grape-sugar, &c. The bran and offal which tails off from the sieve may still contain some particles of starch which the previous processes have not detached from the harder parts of the grain. To effect this secondary recovery of starch from the bran, the bran is received by a conveyer as it tails off from the separator 17 and delivered to an elevator, 20, whereby it is elevated to the mixing-tank 21, in which it is reduced with water to a gravity of from 8° to 12° Baumé. The mixing-tank 21 is provided with suitable stirring devices for thoroughly agitating and mixing the bran and water.

22 represents a pressure-agitator which receives the mixture from the mixing-tank 21, and in which the mixture is thoroughly beaten or agitated under pressure. The agitator, as shown in the drawings, consists of a closed cylindrical vessel, 22, provided with a rotating shaft, 23, having a series of stirring-arms, 24, adapted to move between the stationary arms 25; but any other system of stirrers or agitating devices may be employed which will thoroughly agitate the mixture of bran, starch, and water passing through the vessel. For instance, the latter may be provided with two parallel shafts carrying stirrers which revolve between the stationary arms. Some of the stirrers may be arranged at an angle to the direction of revolution to resist the movement of the mixture through the agitator, in order to stir the mixture more thoroughly.

26 represents the supply-pipe which conducts the liquid from the mixing-tank 21 to one end of the pressure-agitator 22; and 27 is the discharge-pipe through which the liquid escapes from the opposite end of the agitator. Both of these pipes are provided with the usual valves or cocks for regulating the flow of the liquid through them and through the agitator. The discharge-pipe 27 rises above the top of the agitator, whereby the latter is always kept full of liquid, which latter is subjected in the agitator to the pressure of the column of liquid in the supply-pipe 26 and mixing-tank 21. This pressure also tends to keep the agitator filled with the liquid, and insures the proper working of the agitating arms or blades upon the liquid, and causes the solid particles suspended therein to rub against each other and against the agitating arms or stirrers, thereby causing the starch particles which adhere to the bran fragments to become detached, partly by the attrition of the solid particles against each other and partly by the action upon them of the stirring devices.

Instead of producing the desired pressure in the agitator 22 by a column of liquid, as described and shown, it may be produced by pumping the liquid into the agitator and properly regulating its outflow through the discharge-pipe 27. The agitating vessel 22 is provided at its bottom with a drain-pipe, 28, through which the remaining contents of the same can be discharged at the end of the operation, and with a suitable gage to indicate the degree of pressure applied to its contents. This pressure-agitator and its operation are more fully shown and described in a United States Patent granted to me November 3, 1885, and numbered 329,701.

29 represents a tank which receives the agitated liquid from the discharge-pipe 27, and which supplies the liquid to the separator 30. As shown in the drawings, this separator is of similar construction and operation to the separator 17, heretofore described, and its office is to separate the detached particles of starch from the bran and offal, the starch so recovered passing through the screen and into the settlers 31 and 32, heretofore described, for similar treatment to that set forth for the starch obtained by the primary separation. The bran and other offal which tail off from the separator are utilized as feed, either wet or after being dried in the usual manner.

Intermediate receiving or supply tanks for holding the mixture between the various stages of manipulation may be added as desired, or as may be necessary to meet the requirements or exigencies of changes or variations in the arrangements of plants.

If, because of insufficient area of plant or other contingencies or reasons, it is preferred to condense the operation and make but one final separation of the starch from the bran or offal, the operation may be conducted as follows, reference being had to the drawing on Sheet 2: The operation proceeds as heretofore described up to the point when the mixture reaches the mixing-tank 14, from which it is pumped to the elevated receiving and supply tank 21, and is delivered therefrom to the pressure-agitator 22, then to the supply-tank 29, then to the separator 17, and then to the settlers 18 and 19, the bran or offal being carried away from the tail of the separator as before, and each stage of this condensed operation being analogous and similar in every respect to the corresponding stages of the more complete process heretofore described, and the construction of the machinery and appliances being in every respect the same, save only as those rendered superfluous by the condensation of the process to one final separation of starch from the offal are omitted. The disintegration of the crushed grain in the disintegrator 8 liberates the starch particles which adhere to the bran and gluten and renders it possible to recover such particles, while the thorough agitation and attrition to which the subsequent mixtures are subjected in the pressure-agitator complete the liberation of such starch particles as the previous operations have not released, making their recovery also possible, and in both cases preventing the starch particles from passing off with the offal from the separator, and increasing the yield of starch accordingly.

I claim as my invention—

1. The herein-described method of extracting starch from grain, which consists in reducing and steeping the grain, then disintegrating the crushed and steeped grain while held in suspension, whereby the starch becomes partially detached from the bran or offal, then agitating the liquid containing the reduced grain in a closed vessel under pressure, whereby further detachment of the starch from the bran or offal is effected, and then separating the starch from the bran or offal, substantially as set forth.

2. The herein-described method of extracting starch from grain, which consists in reducing and steeping the grain, then reducing the mixture to the proper gravity, then disintegrating the crushed and steeped grain while held in suspension, then regulating the specific gravity, then separating the starch from the bran, then reducing the bran to the proper gravity, then agitating the liquid containing the bran in a closed vessel under pressure, whereby the remaining starch is detached from the bran, and then separating the starch from the bran or offal, substantially as set forth.

3. The herein-described method of extracting starch from grain, which consists in reducing and steeping the grain, then reducing the mixture to the proper gravity and adding the alkali, then disintegrating the crushed and steeped grain while held in suspension, then regulating the gravity, then separating the starch from the bran, then reducing the bran to the proper gravity, then agitating the liquid containing the bran in a closed vessel under pressure, and then separating the remaining starch from the offal, substantially as set forth.

4. The herein-described method of extracting starch from grain, which consists in reducing and steeping the grain, then reducing the mixture to the proper gravity, then disintegrating the crushed and steeped grain while held in suspension, then regulating the gravity, then agitating the liquid in a closed vessel under pressure, and then separating the starch from the offal, substantially as described.

5. The herein-described method of extracting starch from grain, which consists in reducing and steeping the grain, then reducing the mixture to the proper gravity and adding the alkali, then disintegrating the crushed and steeped grain while held in suspension, then regulating the gravity, then agitating the liquid in a closed vessel under pressure, and then separating the starch from the offal, substantially as set forth.

WALTER F. BIRGE.

Witnesses:
JENNIE M. CALDWELL,
JAMES SANGSTER.